United States Patent
Christophe et al.

(10) Patent No.: US 10,956,935 B1
(45) Date of Patent: Mar. 23, 2021

(54) SERVING ADVERTISEMENTS BASED ON PARTIAL QUERIES

(71) Applicant: Google LLC, Mountain View, CA (US)

(72) Inventors: Emmanuel Christophe, Mountain View, CA (US); Japinder Singh, Cupertino, CA (US); Vivek Raghunathan, Fremont, CA (US); Arash Baratloo, Mountain View, CA (US)

(73) Assignee: Google LLC, Mountain View, CA (US)

( * ) Notice: Subject to any disclaimer, the term of this patent is extended or adjusted under 35 U.S.C. 154(b) by 347 days.

(21) Appl. No.: 15/889,896

(22) Filed: Feb. 6, 2018

Related U.S. Application Data

(63) Continuation of application No. 13/774,120, filed on Feb. 22, 2013, now Pat. No. 9,922,344.

(60) Provisional application No. 61/602,942, filed on Feb. 24, 2012.

(51) Int. Cl.
*G06Q 30/00* (2012.01)
*G06Q 30/02* (2012.01)

(52) U.S. Cl.
CPC .............................. *G06Q 30/0256* (2013.01)

(58) Field of Classification Search
CPC ........................................ G06Q 30/0207–0277
See application file for complete search history.

(56) References Cited

U.S. PATENT DOCUMENTS

| | | | |
|---|---|---|---|
| 7,007,074 B2 | 2/2006 | Radwin | |
| 7,499,940 B1 * | 3/2009 | Gibbs | G06F 16/9566 |
| 8,073,860 B2 | 12/2011 | Venkataraman et al. | |
| 2006/0242129 A1 * | 10/2006 | Libes | G06Q 10/10 |
| 2008/0140476 A1 | 6/2008 | Anand et al. | |
| 2008/0189179 A1 | 8/2008 | Marouani et al. | |
| 2009/0006207 A1 | 1/2009 | Datar et al. | |
| 2012/0047025 A1 * | 2/2012 | Strohman | G06Q 30/0275 705/14.71 |
| 2012/0084147 A1 * | 4/2012 | Kannan | G06Q 30/0251 705/14.49 |
| 2012/0296743 A1 * | 11/2012 | Velipasaoglu | G06F 16/9535 705/14.54 |
| 2013/0132209 A1 * | 5/2013 | Belwadi | G06Q 30/02 705/14.72 |

* cited by examiner

*Primary Examiner* — Eric R Netzloff
*Assistant Examiner* — Christopher Stroud
(74) *Attorney, Agent, or Firm* — Fish & Richardson P.C.

(57) ABSTRACT

Methods, systems, and apparatus, including computer programs encoded on a computer storage medium, for serving advertisements based on partial queries. In one aspect, a method includes receiving a request for advertisements that specifies a set of query suggestions. The query suggestions are ranked based, at least in part on a probability of each query suggestion being selected by a user that input the partial query. A proper subset of the query suggestions is selected and includes a highest ranked query suggestion based on the ranking and one or more query suggestions of the set of query suggestions that is at least one of a revision of the highest ranked query suggestion or refers to a same topic as the highest ranked query suggestion. One or more advertisements are identified for each query suggestion of the proper subset. Data specifying the identified advertisements are provided.

19 Claims, 8 Drawing Sheets

SERVING ADVERTISEMENTS BASED ON PARTIAL QUERIES

CROSS-REFERENCE TO RELATED APPLICATIONS

This application is a continuation of U.S. application Ser. No. 13/774,120, entitled "SERVING ADVERTISMENTS BASED ON PARTIAL QUERIES," filed Feb. 22, 2013, which claims the benefit under 35 U.S.C. § 119(e) of U.S. Patent Application No. 61/602,942, entitled "SERVING ADVERTISEMENTS BASED ON PARTIAL QUERIES," filed Feb. 24, 2012, which is incorporated herein by reference in its entirety.

BACKGROUND

This specification relates to data processing and content distribution.

The Internet provides access to a wide variety of resources, such as image files, audio files, video files, and web pages. A search system can select one or more resources in response to receiving a search query. A search query is data that a user submits to a search system to obtain search results for resources in an effort to satisfy the user's informational needs. The search queries can be received in the form of text input, e.g., one or more query terms or in the form of image input, audio input, or other types of input. The search system can select and score resources based on their relevance to the search query and/or on their importance relative to other resources to provide search results that link to the selected resources. The search results are typically ordered according to the scores and presented according to their order.

In addition to search results, an advertising system (or another content distribution system) may provide advertisements (or other content items) that are responsive to the query. For example, the search query may be used to identify an advertisement using a keyword that matches the search query. In turn, the identified advertisement can be provided for presentation with the search results.

Search systems can provide query suggestions to users to help users obtain resources that satisfy their informational needs. As used herein, the term "query suggestion" is a suggested query that can be used to refine a search query that has been input by the user. Some search systems provide query suggestions for a partial query, which can be in the form of a list that can be populated prior to the query input being completed. To facilitate delivery of query suggestions for partial query, a client can send suggestion requests to a search system with each keystroke, and the search system can provide query suggestions having prefixes that match the entered characters. Once received, the client device displays these suggestions for user selection.

SUMMARY

In general, one innovative aspect of the subject matter described in this specification can be embodied in methods that include the actions of receiving a request for advertisements, the request specifying a set of query suggestions, the set of query suggestions being identified for a partial query received from a user device; ranking the query suggestions based, at least in part on a probability of each query suggestion being selected by a user that input the partial query; selecting a proper subset of the query suggestions, the proper subset including a highest ranked query suggestion based on the ranking and one or more query suggestions of the set of query suggestions is at least one of a revision of the highest ranked query suggestion or refers to a same topic as the highest ranked query suggestion; identifying one or more advertisements for each query suggestion of the proper subset; and providing data specifying the identified advertisements. Other embodiments of this aspect include corresponding systems, apparatus, and computer programs, configured to perform the actions of the methods, encoded on computer storage devices.

These and other embodiments can each optionally include one or more of the following features. Selecting the proper subset of the query suggestions can include identifying the highest ranked query suggestion based on the ranking; determining which query suggestions of the set of query suggestions are related to the highest ranked query suggestion by referring to a same topic as the highest ranked query suggestion or being a revision of the highest ranked query; and selecting as the proper subset of query suggestions the highest ranked query suggestion and the query suggestions related to the highest ranked query suggestion.

Determining which query suggestions of the of the set of query suggestions are related to the highest ranked query suggestion can include determining a similarity measure for each query suggestion of the set of query suggestions, the similarity measure being a measure of the similarity between the query suggestion and the highest ranked query suggestion; and determining that each query suggestion having at least a threshold similarity measure is related to the highest ranked query suggestion. The similarity measure for each query suggestion can be based on term overlap between the query suggestion and the highest ranked query suggestion.

The query suggestions can be ranked further based on a commercial value score for each query suggestion. The commercial value score for each query suggestion can be based on at least one of a number of advertisements available for the query suggestion and performance of advertisements for the query suggestion.

The commercial value score for one of the query suggestions can be further based on at least one of a number of advertisements available for query suggestions that reference a same topic as the one query suggestion and performance of advertisements for the query suggestions that reference a same topic as the one query suggestion.

Aspects can include providing instructions that cause the user device to present the one or more advertisements in clusters, each cluster being for an individual query suggestion and including advertisements provided for the individual query suggestion. The instructions can further cause the user device to present a label for each cluster, the label for a cluster identifying the individual query suggestion corresponding to the cluster.

Aspects can further include receiving query data defining the partial query, the partial query being query input from the user device and having one or more characters ordered in an input sequence that defines an order in which the one or more characters were input as the query input; and identifying the set of query suggestions based on the partial query.

Particular embodiments of the subject matter described in this specification can be implemented so as to realize one or more of the following advantages. Relevant advertisements can be identified and provided based on ambiguous or incomplete queries. Query suggestions can be identified for partial queries and used to identify advertisements to provide with search results pages that are presented for the partial queries. Query suggestions for which to provide advertisements can be selected based on a probability that a user will select the query suggestion if provided to the user and/or a commercial value score based on advertisements available for the query suggestions.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
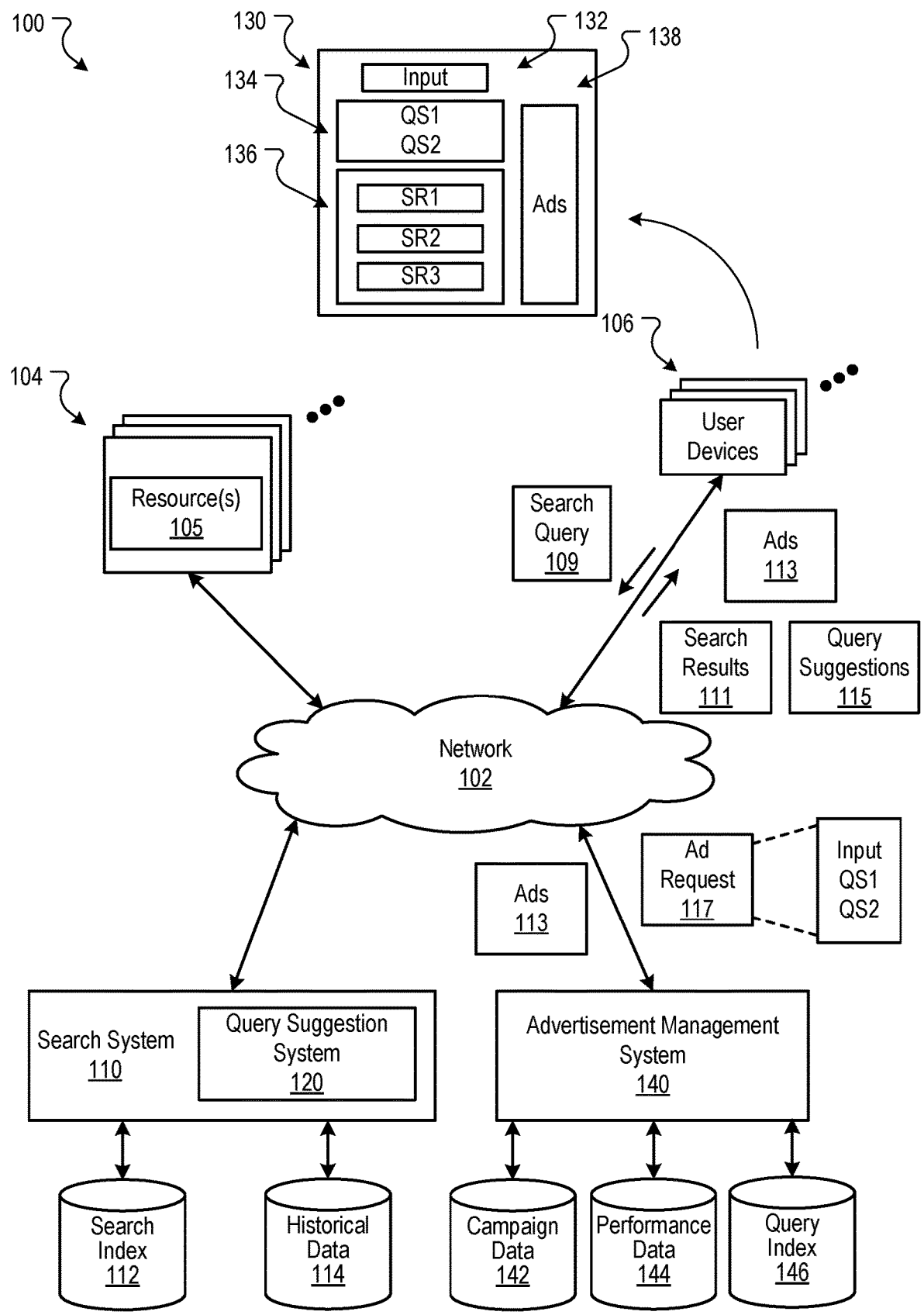
FIG. 1 is a block diagram of an example environment in which a search system provides search services.

A content distribution system, such as an advertisement management system, can provide advertisements (or other content items) for presentation at a search interface with search results that are provided based on a partially entered search query, such as the first few characters or words entered by a user. For example, when a search system provides a search results page in response to a partial query, the content distribution system can select advertisements to be presented with that search results page.

In some implementations, the content distribution system identifies advertisements (or other content items) to provide at the search interface based on query suggestions that have been identified for the partial query. The list of query suggestions may be generated, for example, by a query suggestion system based on the partial query, and the content distribution system can use at least one of the query suggestions to identify advertisements that will be provided to the user. For example, the query suggestion system may generate a list of query suggestions that includes the query suggestions "toy" and "tool" in response to receiving the partial query "to." One or more of these query suggestions can then be used by the content distribution system to identify and/or provide advertisements related to toys and/or tools. In turn, these identified advertisements can be presented, for example, in advertisement slots of a search results page that is presented in response to the partial query to.

The content distribution system may rank the query suggestions for a partial query and identify query suggestions for which to provide advertisements based on the ranking. In some implementations, the content distribution system ranks the query suggestions based on a probability that the user will select the query suggestion if provided as a suggestion to the user. This ranking can then be used to select the top "N" ranked query suggestions (where N can be a non-zero positive integer), that will be used to select advertisements. For example, the content distribution system may select advertisements using the top three query suggestions. In this example, if the top three query suggestions are related to a variety of different topics, the content distribution system may provide advertisements that may not be related to each other, such as advertisements for toys and advertisements for tools.

In some implementations, the content distribution system provides advertisements for the highest ranked query suggestion and/or one or more query suggestions that are related to, or that are refinements of, the highest ranked query suggestion. In this way, the content distribution system can provide a set of advertisements in which each advertisement is related to a topic or vertical that matches the topic or vertical of the highest ranked query suggestion. For example, if a ranking of query suggestions for the partial query "to" includes a highest ranked query suggestion "toy" and lower ranked query suggestions "toy store," and "tools," the content distribution system may provide advertisements for the query suggestions "toy" and "toy store," while not providing advertisements for the query suggestion "tools," as the query suggestion "toy store" is more closely related to the top ranked query suggestion "toy" than the query suggestion "tools."

In some implementations, the content distribution system maintains an index that maps partial queries to query suggestions and accesses the index at query time to identify query suggestions for providing advertisements. For example, the index may include a list of partial queries and, for each partial query, a list of query suggestions for which advertisements may be provided. The query suggestion system may select a proper subset of the query suggestions for a partial query based on one or more of several criteria, such as the probability that user will select the query suggestions, the number of advertisements available for the query suggestions, the performance of advertisements that are available for the query suggestions, and information regarding advertisements for query suggestions that are related to or refinements of the query suggestion. In some implementations, the query suggestion system, or another system, ranks or scores the query suggestions sing an offline process and accesses the ranking or scores at query time to identify the proper subset based on the ranking or scores.

As used herein, a "partial query" is a query input that is received prior to a specified user interaction that identifies the query as complete. User interactions that identify the query as complete include user actions such as a user click of a search initiation element that causes the query to be submitted to the search system or a user selection of a query suggestion. A partial query can thus be one or more keyboard inputs that define a prefix or a stem of a word, or can also be an entire word or words. For example, the letter "a" is a partial query, as the letter "a" is the stem for the words "aardvark," "Appalacia," etc. The partial query itself can also be a word, such as the letter "a" is a word. Likewise, the word "New" is also a partial query, as it can be combined with "York" or "England" to form other queries. In some implementations, a particular set of query input is no longer considered a "partial query" once the user has explicitly submitted the query input to the search system, for example by interacting with a search initiation element.

For purposes of example, the examples throughout this document discuss an advertisement management system that selects advertisements based on the query suggestions. The techniques, methods, and systems discussed throughout this document may also be implemented in other content distribution systems, such as audio or video distribution systems, to select other content items (i.e., discrete units of content that are presented with resources) based on query suggestions.

For situations in which the systems discussed here collect information about users, or may make use of information about users, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that certain information about the user is removed. For example, a user's identity may be treated so that no identifying information can be determined for the user, or a user's geographic location may be generalized where location information is obtained (such as to a city, ZIP code, or state level), so that a particular location of a user cannot be determined. Thus, users may have control over how information is collected about them and used by a content server.

FIG. 1 is a block diagram of an example environment 100 in which a search system 110 provides search services. The example environment 100 includes a network 102, e.g., a local area network (LAN), wide area network (WAN), the Internet, or a combination of them, that connects web sites 104, user devices 106, and the search system 110. The network 102 can be accessed over a wired and/or a wireless communications link. For example, mobile computing devices, such as smartphones can utilize a cellular network to access the network 102. The environment 100 may include millions of web sites 104 and user devices 106.

A web site 104 is one or more resources 105 associated with a domain name and hosted by one or more servers. An example web site is a collection of web pages formatted in hypertext markup language (HTML) that can contain text, images, multimedia content, and programming elements, e.g., scripts. Each web site 104 is maintained by a publisher, e.g., an entity that manages and/or owns the web site 104.

A resource 105 is data provided over the network 102 and that is associated with a resource address. Resources 105 that can be provided by a web site 104 include HTML pages, word processing documents, portable document format (PDF) documents, images, video, and feed sources, to name just a few. The resources 105 can include content, e.g., words, phrases, images and sounds and may include embedded information (e.g., meta information and hyperlinks) and/or embedded instructions (e.g., scripts).

A user device 106 is an electronic device that is capable of requesting and receiving resources 105 over the network 102. Example user devices 106 include personal computers, mobile computing devices (e.g., smartphones and/or tablet computing devices) that can send and receive data over the network 102. As used throughout this document the term mobile computing device ("mobile device") refers to a user device that is configured to communicate over a mobile communications network. A smartphone (i.e., a phone that is enabled to communicate over the Internet) is an example of a mobile device. A user device 106 typically includes a user application, e.g., a web browser, to facilitate the sending and receiving of data over the network 102.

To facilitate searching of resources 105, the search system 110 identifies the resources 105 by crawling and indexing the resources 105 provided on web sites 104. Data about the resources 105 can be indexed based on the resource to which the data corresponds. The indexed and, optionally, cached copies of the resources 105 are stored in a search index 112.

The user devices 106 submit search queries 109 to the search system 110. The search query 109 can include one or more characters or one or more search terms. A search term can, for example, include a keyword submitted as part of a search query 109 to the search system 110 that is used to retrieve responsive search results 111. In some implementations, the query may be non-textual, such as an audible or voice query, or an image query.

The search queries 109 are submitted in the form of a search request that includes the search query 109. In response to the search request, the search system 110 accesses the search index 112 to identify resources 105 that are relevant to (e.g., have at least a minimum specified relevance score for) the search query 109. The search system 110 identifies the resources 105, generates search results 111 that identify the resources 105, and returns the search results 111 to the user devices 106. A search result 111 is data generated by the search system 110 that identifies a resource 105 that is responsive to a particular search query, and includes a link to the resource 105. An example search result 111 can include a web page title, a snippet of text or a portion of an image extracted from the web page, and the URL of the web page.

The user devices 106 receive the search results pages and render the pages for presentation to the users. In response to the user selecting a search result at the user device 106, the user device 106 requests the resource locator included in the selected search result. The publisher of the web site hosting the resource receives the request for the resource from the user device 106 and provides the resource to the requesting user device 106.

In some implementations, data for the search queries 109 submitted during user sessions are stored in a data store, such as the historical data store 114. For example, the search system 110 can store received search queries in the historical data store 114. Selection data specifying actions taken in response to search results 111 provided in response to each search query 109 are also stored in the historical data store 114, for example by the search system 110. These actions can include whether a search result 111 was selected, e.g., clicked or hovered over, and for each selection, for which search query 109 the search result 111 was provided. In some implementations, the query data are stored in a query log and the selection data are stored in a separate selection log.

The data stored in the historical data store 114 can be used to map search queries 109 submitted during search sessions to resources 105 that were identified in search results 111 and the actions taken by the users. The data stored in the historical data store 114 can thus be used by the search system 110 to determine the sequence of queries submitted by the user devices 106, the actions taken in response to the search queries 109, and how often the search queries 109 are submitted.

The search system 110 can be configured to process partial queries that have been entered into a search interface by a user. For example, prior to performance of a specified user interaction that identifies the query as complete, the search system 110 may receive characters that have been entered into the search interface. As described in more detail below, the search system 110 can use this partial query to select query suggestions to be provided to the user device 106. Additionally, the search system 110 can also use the partial query and/or the query suggestions to select search results for presentation on a search results page that is provided in response to the partial query. This search results page can include advertisement slots that can be populated with advertisements that are selected by and/or provided by an advertisement management system 140. As a user continues to enter characters into the search interface, the search system 110 can select new query suggestions based on the updated partial query and provide additional search results pages for presentation at the user device 106. These additional search results pages can also include advertisement slots that can be populated by additional advertisements that are selected by and/or provided by the advertisement management system 140.

The advertisement management system 140 is a content distribution system that facilitates the delivery of advertisements 113 for presentation with the resources 105. In particular, the advertisement management system 140 allows advertisers to define rules that take into account attributes of the particular user to provide advertisements 113 that may be of interest to the user. Example rules include keyword-based rules, in which an advertiser provides bids for keywords that are present in either search queries or web page content. In some implementations, advertisements that are associated with keywords having bids that result in an advertisement slot being awarded in response to an auction are selected for displaying in the advertisement slots.

Advertisements 113 can be provided for many different resources, such as the resources 105, on a search results resource, and, as will be described in more detail below, with a resource that includes a search interface 130. For example, a resource 105 can include instructions that cause the user device 106 to request advertisements 113 from the advertisement management system 140, for example by submitting an advertisement request 117 to the advertisement management system 140. The advertisement request 117 can include a publisher identifier and, optionally, keyword identifiers related to the content of the resource or other information that can be used by the advertisement management system 140 to identify advertisements. The advertisement management system 140, in turn, provides advertisements 113 to the particular user. When a user selects an advertisement 113, the user device 106 generates a request for a landing page of the advertisement 113, which is typically a web page of the advertiser.

With respect to a search results page, the user device 106 renders the search results page and sends an advertisement request 117 to the advertisement management system 140, along with one or more keywords related to the query that the user provided to the search system 110. However, as will be described in more detail below, in some implementations, advertisements can be based on a current query input that does not constitute a completed query, referred to herein as a "partial query." For example, advertisements 113 can be provided based on a single character input, or on a current input that forms a stem for many different words or phrases.

For partial queries, advertisements can be provided based on query suggestions 115 that are selected for the partial query. For example, an advertisement request 117 for a partial query can include one or more query suggestions 115, such as query suggestions "QS1" and QS2," in place of or in addition to the partial query. As described in more detail below, the search system 110 can identify one or more query suggestions 115 for the partial query and provide instructions that cause the user device 106 to provide data specifying the identified query suggestion(s) 115 to the advertisement management system 140, for example as part of an advertisement request 117.

The advertisement management system 140 includes a data storage system that stores campaign data 142 and performance data 144. The campaign data 132 stores advertisements, advertisement selection rules information, and budgeting information for advertisers. The performance data indicates the performance of advertisements 113 that are served. Such performance data can include, for example, click through rates for advertisements 113, the number of impressions for advertisements 113, and the number of conversions for advertisements 113. Other performance data can also be stored. In some implementations, the performance data 113 can be partitioned based on actual queries entered by users, on partial queries entered by users, and/or on queries that have been suggested to users. As the performance of the advertisements 113 may vary based on the query type, e.g., actually entered, suggested, or partial, the advertisements 113 that are selected for a query consisting of particular characters or words can vary on the type of query.

In some implementations, the campaign data 142 and the performance data 144 are used as input parameters to an advertisement auction. In particular, the advertisement management system 140, in response to each request for advertisements, can conduct an auction to select advertisements 113 that are provided in response to the request. The advertisements 113 are ranked according to a score that, in some implementations, is proportional to a value based on an advertisement bid and one or more parameters specified in the performance data 144.

The data storage system of the advertisement management system 140 can also include a query index 146 that stores information regarding partial queries and/or query suggestions 115. In some implementations, the query index 146 includes a list of partial queries and, for each partial query, a list of query suggestions 115 that may be used to identify advertisements for the partial query. Each query suggestion 115 in a list of query suggestions for a partial query may also have a selection probability score that indicates the probability that the query suggestion 115 would be selected if provided to a user as a suggestion for the partial query.

In some implementations, the query index 146 includes a commercial value score for query suggestions 115 indexed in the query index 146. In general, the commercial value score for a query suggestion 115 indicates the commercial value of the query suggestion 115 for advertisement purposes. For example, the commercial value score for a particular query suggestion (e.g., query suggestion 115) may be based on a number of advertisements 113 available for the particular query suggestion, a performance measure (e.g., a click-through rate or a conversion rate) of advertisements 113 available for the particular query suggestion, and/or data regarding advertisements 113 for other query suggestions that that differ from, but are related to the particular query suggestion or that are refinements of the particular query suggestion.

As described in more detail below, for advertisement requests 117 for partial queries, the advertisement management system 140 may use the selection probability scores and/or the commercial value scores to select query suggestions for providing advertisements. The advertisement management system 140 can use the selected query suggestions to identify advertisements 113 and provide the identified advertisements 113 to the user device 106 that sent the advertisement request 117.

Although the advertisement management system 140 is illustrated as a separate system from the search system 110 in FIG. 1, the advertisement system 140 can be a part of, integrated into, or in direct or indirect communication with the search system 110 in certain implementations.

In addition to providing search results 111 in response to queries, the search system 110, by use of a query suggestion system 120, provides query suggestions 115 and/or search results 111 for query suggestions 115 to user devices 106. Query suggestions 115 and/or search results 109 for one or more of the query suggestions 115 can be provided by the search system 110 in response to a query suggestion request from the user device 106. A query suggestion request may be initiated automatically, for example in response to each character of a query being entered, in response to a certain number of characters being entered, or in response to a time delay between characters being entered. A query suggestion request can include data specifying each character of the query that has been entered and the order in which the characters were entered.

In some implementations, the query suggestion system 120 accesses the historical data store 114 and determines a list of query suggestions 115 based on queries that have the query characters as a stem, or, alternatively or in addition, queries that are related by topic (e.g., have been classified to a same or matching topic) or related by co-occurrence (e.g., have both been received during a same search session at least a threshold number of times). In some implementations, the query suggestions 115 are based on search history data associated with an identifier corresponding to the user device 106 that submitted the query suggestion request. For example, the query suggestions 115 can be suggestions based on frequency co-occurrence and query stemming of queries stored in the historical data store 114 associated with the identifier.

In some implementations, the search system 110 maintains an index, for example in the search index 112, of query suggestions 115 for each of a set of partial queries. When a query suggestion request is received, the search system 110 can access the index to retrieve the query suggestions 115 for the partial query included with the request. The search system 110 may interact with the query suggestion system 120 to identify query suggestions 115 that have the partial query as a stem or that are related to the partial query by topic or co-occurrence, and index at least a portion of the identified query suggestions 115 in the search index 112 with reference to the partial query.

The search system 110 (or query suggestion system 120) may select query suggestions 115 to index for a partial query based on a ranking of the query suggestions 115 that have been identified for the partial query. For example, the search system 110 may rank the query suggestions 115 based on a probability that the query suggestions 115 will be selected by a user (e.g., selection probability score) and select the top N query suggestions 115 in the ranking. Or, the search system 110 may select, for indexing, each query suggestion 115 that has at least a threshold probability of being selected by a user.

To illustrate an example query suggestion operation, assume a user device 106 requests a search resource from the search system 110. The search system 110 provides the requested search resource and interface instructions to the user device 106. The search resource and interface instructions cause the user device 106 to generate a search interface 130 that includes a query input field 132 and a search results area 136 where search results, such as search results SRL SR2, and SR3 are presented. In some implementations, the user device 106 can request a search page that searches a combination of text, images, and/or videos. The search system 110 can provide HTML and scripts that cause the user device 106 to generate the search interface 130 with the query input field 132.

The query input field 132 can receive query characters from a user, e.g., keystroke inputs, and provide each input to the search system 110. In response to the query suggestion request, the search system 110, for example in connection with the query suggestion system 120, identifies and ranks query suggestions 115 according to an order from highest rank to lowest rank. For example, the query suggestion system 120 can access the historical data store 114 and determine query suggestions 115 based on search queries that have the query characters "mp" as a query stem, e.g., "mp3 player," "mp3 converter," and "mpg calculator." Or, the search system 110 can access the search index 112 to identify and rank query suggestions indexed for the partial query. The search system 110 can also identify search results 111 for one or more of the query suggestions 115, such as for the highest ranked query suggestion. The search system 110 can provide the identified query suggestions 115 and/or the identified search results 111 to the user device 106.

Various ranking algorithms can be used to rank query suggestions 115. In some implementations, the query suggestions 115 are ranked based on the probability of the query suggestion 115 being selected by a user. In some implementations, the query suggestion 115 with the highest rank is the shortest word with the highest probability of being selected by the user. In some implementations, the query suggestions 115 are ranked or re-ranked so natural extensions are shown and grouped together.

In some implementations, the user device 106 receives the query suggestions 115 and renders the query suggestions 115 according to an order. The query suggestions 115 can be presented in a query suggestion box 134 according to an order from a highest rank to a lowest rank. For example, the user device 106 can present query suggestions QS1 and QS2 in a query suggestion box 134 in the search interface 130. If the user selects a query suggestion 115, the user device 106 can submit a request to the search system 110 for search results 111 responsive to the selected query suggestion 115.

As described above, when a user device 106 renders a search results page, the user device 106 may also send an advertisement request 117 to the advertisement management system 140 for advertisements 113 related to an entered search query 109. However, when the entered query is a partial query or query stem, the partial query may be an ambiguous signal of the user's interest. For example, the query "m" is the first letter of many different words and queries that cover many different subjects and interests.

Thus, in some implementations, the advertisements 113 can be selected for partial queries based on query suggestions 115 for the partial query. For example, when a query suggestion request is received by the search system 110 with a partial search query, the search system 110 can identify one or more query suggestions 115 related to the partial query. The search system 110 can include instructions in the search interface 130 that cause the user device 106 to submit an advertisement request 117 to the advertisement management system 140 for one or more advertisements 113 for the identified query suggestions 115. For example, the advertisement request 117 may include data specifying each identified query suggestion 115 and/or the partial query for which the query suggestions 115 were identified. The advertisement management system 140 can select one or more of the query suggestions 115 for use in identifying advertisements 113, identify advertisements 113 for each selected query suggestion 115, and provide the identified advertisements 113 to the user device 106.

The advertisements 113 provided for query suggestions 115 can be presented in an advertisement display area 138 of the search interface 130. For example, the advertisement display area 138 may be disposed above search results, on either or both sides of search results, below search results, interspersed with search results, or in any other location of the search interface 130.

In some implementations, the advertisements 113 provided for query suggestions 115 are clustered based on the query suggestion 115 for which the advertisements were provided.

To illustrate, assume that the advertisement management system 140 has determined to provide advertisements 113 for query suggestions "mp3 player" and "mp3 converter" in response to receiving the partial query "mp." One or more advertisements 113 for the query suggestion "mp3 player," such as advertisements 113 for particular mp3 players, may be presented in a first cluster, while advertisements 113 for the query suggestion "mp3 converter" may be presented in a second cluster.

In some implementations, advertisements 113 or clusters of advertisements 113 for query suggestions 115 are labeled with their respective query suggestion 115. Continuing the previous example, the cluster of advertisements 113 for the query suggestion "mp3 player" or individual advertisements 113 for the query suggestion "mp3 player" may include a textual label, e.g., "Sponsor Content for mp3 Players," that indicates that the advertisements 113 were provided for that query suggestion 115 and/or a topic to which the query suggestion 115 is relevant.

Figure 2:
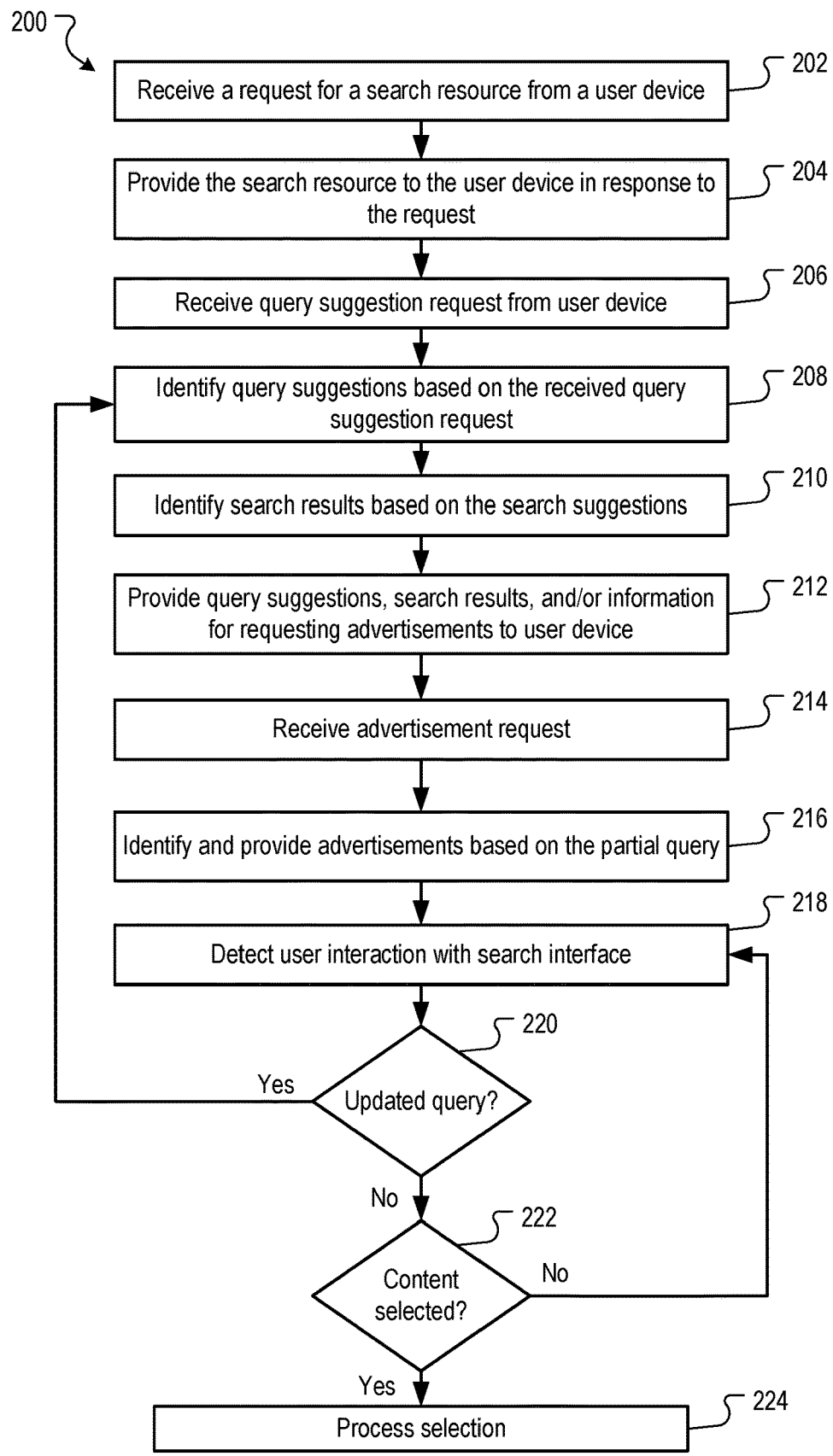
FIG. 2 is a flow chart of an example process for providing advertisements in response to receiving a search query.

FIG. 2 is a flow chart of an example process 200 for providing advertisements in response to receiving a partial query. The process 200 can, for example, be implemented by a data processing apparatus of the search system 110 in conjunction with a data processing apparatus of the advertisement management system 140. The process 200 can also be implemented by instructions stored on a non-transitory computer readable medium, where execution of the instructions cause a data processing apparatus to perform operations of the process 200.

A request for a search resource is received (202). For example, the search system 110 may receive a request for a web search page from a user device 106. The request may be sent to the search system 110 over the network 102.

The search resource is provided in response to the request (204). For example, the search system 110 may provide the search resource to the user device 106 that requested the search resource. The search resource includes interface instructions that cause the user device 106 to generate a search interface 130 that includes a query input field 132. For example, the search system 110 can provide a web search page, including HTML and scripts, to the user device 106. The user device 106 can use the HTML and scripts to render a search interface 130 that includes a query input field 132.

A query suggestion request is received (206). For example, the search system 110 may receive a query suggestion request from the user device 106. Each query suggestion request is generated in response to a query input in the query input field 132. For example, the user device 106 can generate a query suggestion request from query input entered in the query input field 132 by a user. The user device 106 can determine that a word or part of a word is entered into the query input field 132 and can generate a query suggestion request for each character in the word or the partial word. Alternatively, the user device 106 can generate a query suggestion request for every N characters, or each word input into the query input field 132. The query suggestion request can include data defining the characters input into the query entry field 132 and the sequence in which the characters were entered.

In response to the query suggestion request, the search system 110 can identify query suggestions 115 based on the query input (208). In some implementations, the search system 110 provides the query input to the query suggestion system 120. In turn, the query suggestion system 120 identifies a set of query suggestions 115 and ranks the query suggestions 115 based, for example, on a probability that the query suggestions 115 will be selected by the user that input the query. The search system 110 can select query suggestions 115 to provide to the user based on the ranking.

Search results 111 are identified (210). In some implementations, the search system 110 identifies search results 111 for one or more of the query suggestions 115 of the set of query suggestions 115. For example, the search system 110 may identify search results 111 for the highest ranked query suggestion 115 to provide to the user. In some implementations, the search system 110 identifies search results 111 for the highest ranked query suggestion 115 if the probability that the user will select the highest ranked query suggestion 115 exceeds a probability threshold. For example, the search system 110 may only provide search results 111 for a query suggestion 115 if the query suggestion 115 has a high probability of being selected.

The set of query suggestions 115, the identified search results 111, if any, and instructions for requesting advertisements 113 for the partial query are provided (212). For example, the search system 110 may provide instructions to the user device 106 to render the set of query suggestions 115 and the search results 111 in the search interface 130. The query suggestions 115 and search results 111 can each be ordered on the search interface 130 according to their respective ranking. For example, the query suggestions 115 may be ordered from highest to lowest based on the probability that the user will select the query suggestion 115. The search results 111 may be ordered based on their relevance to the query suggestion 115 for which the search results 111 were identified.

The instructions for requesting advertisements 113 can include instructions for submitting an advertisement request 117 to the advertisement management system 140. The instructions for requesting advertisements 113 can also include instructions for including, in the advertisements request 117, information specifying the partial query and/or a set of query suggestions that may be used to identify advertisements for the partial query. The set of query suggestions included in the advertisement request 117 may include all of the query suggestions provided to the user device 106 responsive to the query suggestion request, or a certain number of the higher ranked query suggestions for the partial query, for example as ranked based on the probability that the query suggestions 115 will be selected by the user that input the query. Providing the information specifying the query suggestions 115 enables the advertisement management system 140 to select advertisements 113, at least in part, on keywords of the query suggestions 115.

The advertisement request 117 is received by the advertisement management system 140 (214). For example, the user device 106 may generate and send the advertisement request 117 to the advertisement management system 140 in response to the instructions provided by the search system 110.

Advertisements 113 are identified and provided for the partial query (216). In some implementations the advertisement management system 140 selects a proper subset of the query suggestions 115 included in the advertisement request 117 for use in identifying advertisements, for example based on a ranking, and identifies advertisements for each selected query suggestion. The advertisement management system 140 may select advertisements 113 for each selected query suggestion based on the terms of the query suggestion 115, the campaign criteria 142, and the performance data 144. The advertisement management system 140 can provide the identified advertisements 113 to the user device 106 for rendering to the user. Once received, the user device 106 can present the advertisements 113 in the search interface 130.

User interaction with the search interface 130 is detected (218). For example, the user device 106 can detect user interaction with the query entry field 132, query suggestions 115, search results 111, and/or advertisements 113 presented in the search interface 130. If a user interaction is detected, the user device 106 can provide data to the search system 110 specifying the user interaction. For example, this data can include data defining an updated query, data specifying a selected query suggestion 115, data specifying a selected search result 111, or data specifying a selected advertisement 113.

A determination is made whether the query has been updated (220). For example, the user may input another character into the query entry field 132. In response to the updated query, the user device 106 may provide an updated query suggestion request with data defining the updated query to the search system 110. In turn, the search system 110 may identify and provide query suggestions 115 for the updated query, along with search results 111 and/or and instructions to request advertisements 113 based on the updated query. The query suggestions 115, search results 111, and advertisements 113 identified in response to the instructions can replace the previously presented query suggestions, search results, and advertisements presented in the search interface 130.

To illustrate, assume the partial query of the initial query suggestion request was "b." Query suggestions 115 for Boston, banks, beds, and bars may be provided. In addition, search results 111 for Boston may be provided as well as advertisements 113 for Boston and beds. If the updated query is "ba," then query suggestions for banks, bars, and backpacks may replace the query suggestions for Boston, banks, beds, and bars. In addition, search results for banks may replace the search results for Boston, and advertisements for banks and backpacks may replace the advertisements for Boston and beds.

If the query has not been updated, a determination is made whether content presented in the search interface, e.g., a query suggestion 115, search result 111, or advertisement 113, has been selected (222). If content has not been selected and the query has not been updated, the user device continues to detect user interaction with the search interface 130 (218).

If a determination is made that content has been selected, the content selection is processed (224). For example, if a query suggestion 115 has been selected, the user device 106 can provide data specifying the selected query suggestion to the search system 110. In turn, the search system 110 can identify and provide to the user device 106 search results for the selected query suggestion. The search system 110 can also store information regarding the selected query suggestion in the historical data store 114. For example, the search system 110 can store data specifying that the selected query suggestion was selected for the partial query that was input by the user. This data enables the search system 110 to better identify and rank query suggestions for partial queries.

By way of another example, if a search result has been selected, the user device 106 can request the resource 105 referenced by the search result. For example, the user device 106 may request a web page linked to by the selected search result. In response, the publisher may provide the resource 105 to the user device 106 and the user device 106 can present the resource to the user. The user device 106 may also provide data specifying the selected search result to the search system 110. The search system 110 can store data regarding the selected search result in the historical data store 114. For example, the search system 110 can store data specifying that the selected search result was selected for the partial query that was input by the user in the historical data store 114. This data enables the search system 110 to better identify and rank search results for partial queries.

By way of yet another example, if an advertisement 113 has been selected, the user device 106 can request a resource 105, such as a landing page referenced by the selected advertisement 113. For example, the user device 106 may request a landing page from a web site of the advertiser associated with the advertisement 113. In response, the advertiser may provide the landing page to the user device 106 and the user device 106 can present the landing page to the user. The user device 106 may also provide data specifying the selected advertisement 113 to the search system 110 and/or the advertisement management system 140.

The advertisement management system 140 can update the performance data based on the data specifying the selected advertisement 113. For example, the advertisement management system 140 may update an overall performance measure for the selected advertisement 113, such as an overall click through rate, for all queries for which the advertisement 113 was provided. If a conversion occurred, e.g., the user consummated a purchase from the advertiser, the advertisement management system 140 can update the number of conversions and conversion rate for the advertisement 113.

The advertisement management system 140 may also update a performance measure for the advertisement 113 with respect to the partial query and/or a performance measure for the advertisement 113 with respect to the query suggestion 115 for which the advertisement 113 was requested.

In some implementations, the advertisement management system 140 may also update a performance measure for advertisements 113 of a particular vertical with respect to the partial query. For example, the advertisement management system 140 may serve advertisements directed to pizza restaurants and advertisements directed to pianos for the partial query "pi." The advertisement management system 140 can maintain performance measures for the partial query "pi" with respect to advertisements directed to pizza restaurants and other performance measures with respect to advertisements directed to pianos. For example, the advertisement management system 140 may maintain an overall click-through rate for advertisements for pizza restaurants when provided for the partial query "pi" and an overall click-through rate for advertisements for pianos when provided for the partial query "pi."

Similar performance measures to those discussed above can also be stored and updated for advertisements that were not selected. For example, a count of the number of impressions for an advertisement that was not selected may be incremented while the click-through rate for the advertisement may be reduced.

Query suggestions for identifying advertisements can be selected in several ways. In some implementations, the proper subset of query suggestions 115 for providing advertisements 113 is selected based, at least in part, on the ranking of query suggestions 115 that are provided to the user. For example, the proper subset of query suggestions may be selected based in part on the probability that the user will select the query suggestions 115. In some implementations, the proper subset of query suggestions for providing advertisements 113 is selected based on a commercial value score for each query suggestion 115. The commercial value score for a particular query suggestion can be based on a number of advertisements 113 available for the query suggestion, a performance measure of the advertisements 113 available for the query suggestion, and/or data regarding advertisements 113 for query suggestions that are related to the query suggestion or that are refinements of the query suggestion.

In some implementations, all or a substantial portion of the query suggestion selection process is completed online, for example after receiving a query suggestion request. For example, the advertisement management system 140 may rank the query suggestions 115 received in an advertisement request 117 based on the probability that the user will select the query suggestion (e.g., selection probability score) and select one or more of query suggestions based on the ranking. In some implementations, at least a portion of the query suggestion selection process is completed offline. For example, the advertisement management system 140 can determine a commercial value score for query suggestions offline and use the commercial value scores to rank query suggestions 115 included in an advertisement request 117 after receiving the advertisement request 117. The scores or ranking for query suggestions can be indexed, for example in the query index 146, and the query index 146 can be accessed by the advertisement management system 140 to select the proper subset of query suggestions for which to serve advertisements 113.

Figure 3:
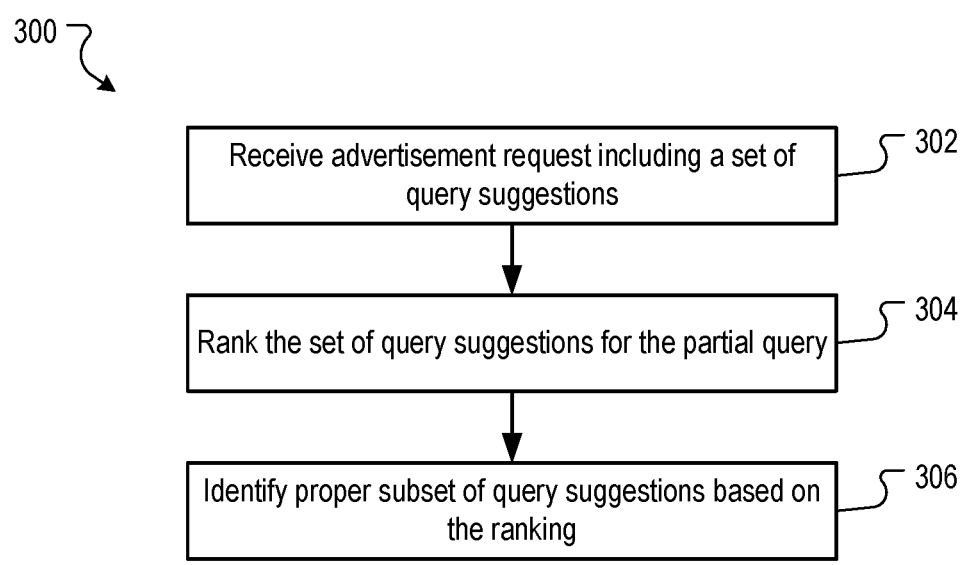
FIG. 3 is a flow chart of an example process for identifying a proper subset of query suggestions for a partial query.

FIG. 3 is a flow chart of an example process 300 for identifying a proper subset of query suggestions for a partial query. The process 300 can, for example, be implemented by the advertisement management system 140. The process 300 can also be implemented by instructions stored on a non-transitory computer readable medium, where execution of the instructions cause a data processing apparatus to perform operations of the process 300.

An advertisement request 117 including data specifying a set of query suggestions 115 is received (302). For example, the user device 106 may generate and submit the advertisement request 117 to the advertisement management system 140 in response to instructions received from the search system 110. The set of query suggestions may be selected by the search system 110 based on a partial query received with a query suggestion request submitted to the search system 110 by the user device 106.

The set of query suggestions 115 are ranked according to an order from highest rank to lowest rank (304). For example, the advertisement management system 140 may rank the query suggestions 115 based on the probability of the query suggestions 115 being selected by the user that input the partial query and/or commercial scores for the query suggestions. In some implementations, the query suggestion with the highest rank is the shortest word with the highest probability of being selected by the user.

A proper subset of the query suggestions 115 are identified based on the ranking (306). In some implementations, the advertisement management system 140 may select a certain number N (where N can be a non-zero positive integer) of the highest ranked query suggestions 115 according to the ranking. For example, the advertisement management system 140 may identify as the proper subset the top 2, 5, or 10 query suggestions 115 according to the ranking.

Figure 4:
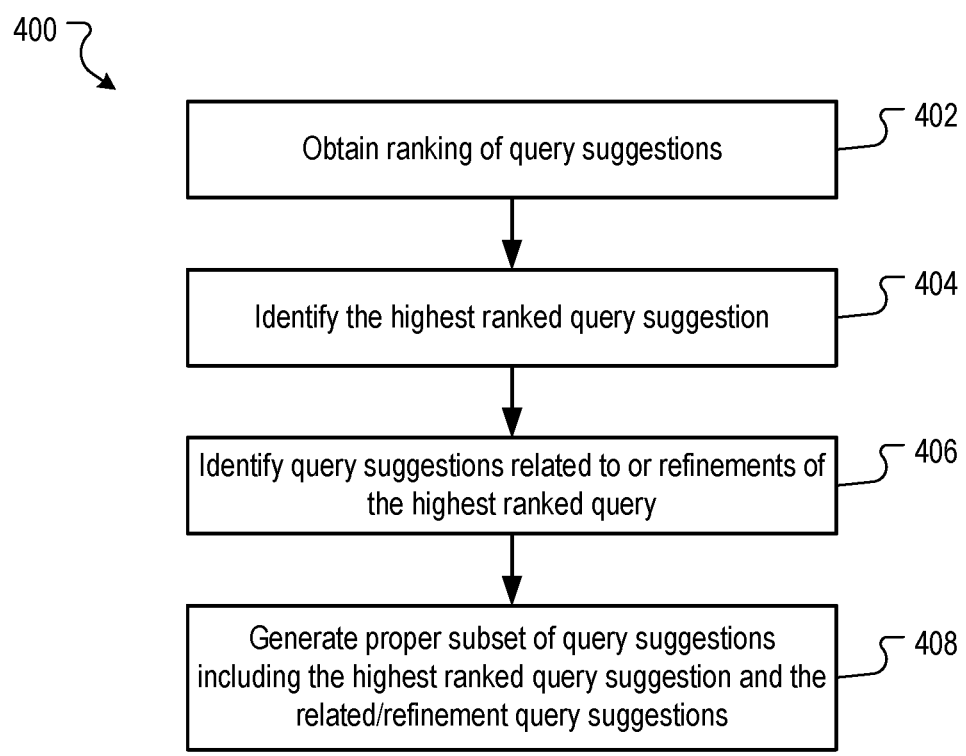
FIG. 4 is a flow chart of another example process for identifying a proper subset of query suggestions for a partial query.

FIG. 4 is a flow chart of an example process 400 for identifying a proper subset of query suggestions based on a ranking of query suggestions. The process 400 can, for example, be implemented by the advertisement management system 140. The process 400 can also be implemented by instructions stored on a non-transitory computer readable medium, where execution of the instructions cause a data processing apparatus to perform operations of the process 400.

A ranking of query suggestions 115 is obtained (402). For example, the advertisement management system 140 can receive data specifying a ranking of query suggestions 115 or generate a ranking using the process 300 illustrated in FIG. 3 and described above. The ranking specifies an order of the query suggestions 115 from a highest rank to a lowest rank based on a partial query.

The highest ranked query suggestion is identified (404). For example, the advertisement management system 140 can identify the highest ranked query suggestion in the obtained ranking.

Query suggestions that are related to or that are refinements of the highest ranked query suggestion are identified (406). For example, the advertisement management system 140 can identify query suggestions in the ranking that are related to or that are refinements of the highest ranked query suggestion. In some implementations, a query suggestion is considered to be related to another query suggestion if the two query suggestions are sufficiently similar, for example based on a similarity score for the two query suggestions. In general, the similarity score for two query suggestions measures the similarity between the two queries and can be based on various similarity measures, such as term overlap, synonym measures, and/or term transformation cost measures. In some implementations, a higher similarity score for two query suggestions indicates more similarity of the two query suggestions than a lower similarity score.

The advertisement management system 140 can determine a similarity score for each query suggestion 115 with respect to the highest ranking query suggestion and identify related queries for the highest ranked query suggestion based on the similarity scores. For example, the advertisement management system 140 may identify as related query suggestions, the query suggestions having at least a threshold similarity score with respect to the highest ranked query suggestion. In some implementations, the advertisement management system 140 may identify as related query suggestions a certain number N (where N can be a non-zero positive integer) of the query suggestions having the highest similarity scores with respect to the highest ranked query suggestion.

In some implementations, the similarity score for two query suggestions is a measure of semantic relatedness indicative of a measure of likeness of meaning (e.g., by using ontologies to define a distance between two phrases or by using a vector space model to determine a distance between the two phrases). This measure of semantic relatedness can then be compared to a threshold measure of semantic relatedness to determine whether the two phrases are considered "related". For example, if the measure of semantic relatedness for two phrases (e.g., query suggestions) exceeds the threshold measure of semantic relatedness, the two phrases can be considered "related."

In some implementations, the query index 146 includes a list of refinements for the indexed query suggestions 115 and the advertisement management system 140 accesses the list to identify query suggestions 115 that are refinements of the highest ranked query suggestion and/or query suggestions for which the highest ranked query suggestion is a refinement. In some implementations, the search system 110 maintains the list of refinements based on user query refinements and provides the list of refinements to the advertisement management system 140. For example, if a user refines a query "New York" to the query "New York City," then the search system 110 may store information specifying the refinement in the historical data store 114. If this refinement occurs at least a threshold number of times, then the search system 110 may include the query "New York City" as a refinement of the query "New York" in the search index 112. In turn, the search system 110 may provide information specifying the refinement to the advertisement management system 140.

In some implementations, the advertisement management system 140 evaluates query refinements for the highest ranked query suggestion to determine that the query suggestions are refinements for the highest ranked query suggestion. For example, the advertisement management system 140 may compare a category or vertical for the highest ranked query suggestion to the category or vertical for each refinement query suggestion to ensure that there is a match. If there is not a match for a query refinement, then the advertisement management system 140 may not consider the query refinement for providing advertisements.

In some implementations, the search system 110 may limit the query suggestions for which to serve advertisements 110 for partial queries having an inverse document frequency ("IDF") that is above a threshold IDF. In some implementations, the search system 110 provides instructions for requesting advertisements for the highest ranking query only for partial queries that have an IDF that is above the threshold IDF. In some implementations, the search system 110 provides instructions for requesting advertisements for the highest ranking query suggestion and a threshold number (e.g., one or two) of the most semantically related or closest refinements to the highest ranking suggestion only for partial queries having an IDF that exceeds the threshold IDF.

A proper subset of the query suggestions is generated (408). In some implementations, the advertisement management system 140 generates a proper subset that includes the highest ranked query suggestion and query suggestions that are considered to be related to the highest ranked query suggestion. In some implementations, the advertisement management system 140 generates a proper subset that includes the highest ranked query suggestion and the query suggestions that are considered to be refinements of the highest ranked query suggestion and/or query suggestions for which the highest ranked query suggestion is a refinement.

In some implementations, the advertisement management system 140 includes in the proper subset related query suggestions and refinements that are ranked above a certain ordinal position in the ranking only. For example, the advertisement management system 140 may only include related or refinement query suggestions that are ranked in the top 20 query suggestions for the partial query.

Figure 5:
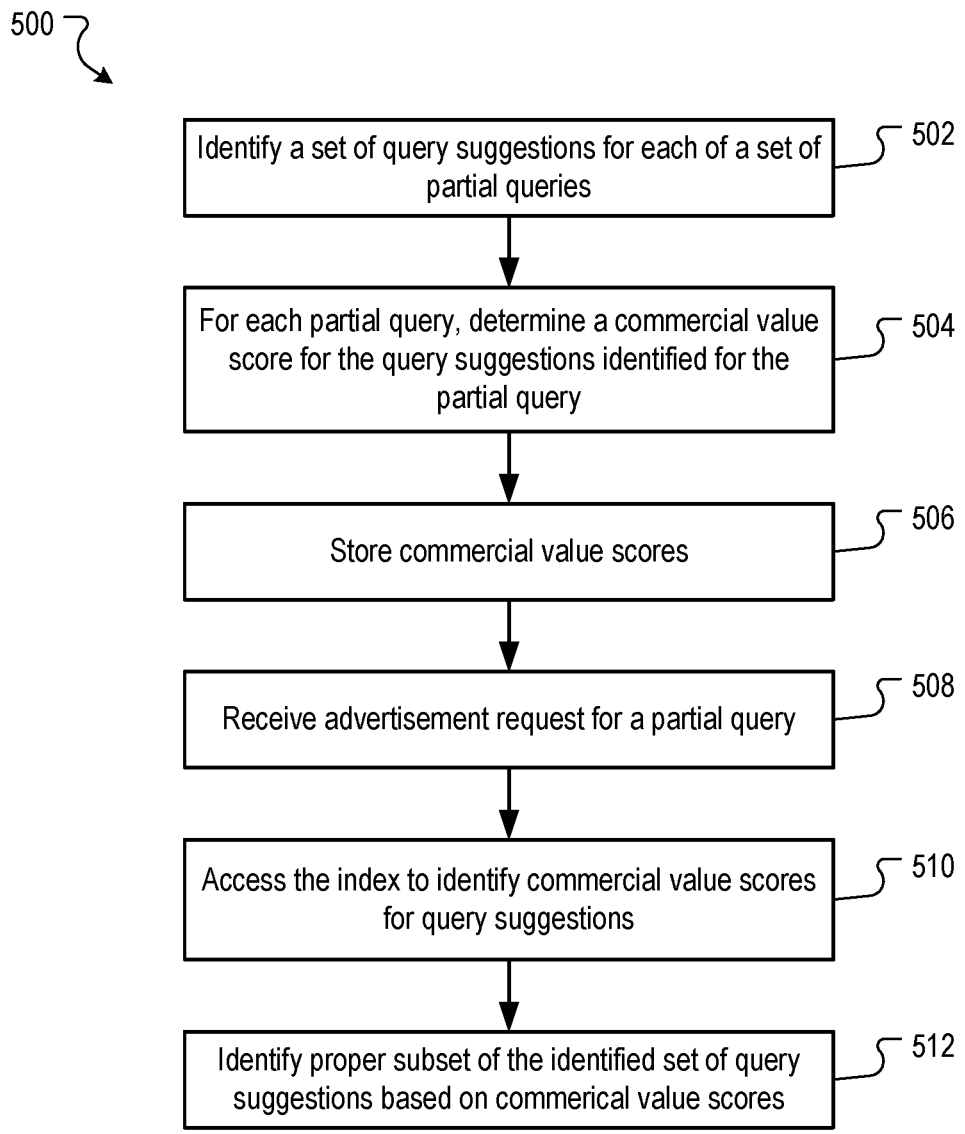
FIG. 5 is a flow chart of another example process for identifying a proper subset of query suggestions for a partial query.

FIG. 5 is a flow chart of another example process 500 for identifying a proper subset of query suggestions for a partial query. The process 500 can, for example, be implemented by, a data apparatus of the search system 110 in conjunction with a data apparatus of the query suggestion system 120 and a data apparatus of the advertisement management system 140. The process 500 can also be implemented by instructions stored on a non-transitory computer readable medium, where execution of the instructions cause a data processing apparatus to perform operations of the process 500.

A set of query suggestions 115 are identified for each partial query in a set of partial queries. For example, the search system 110 can identify a set of query suggestions 115 for each partial query and store a list of the query suggestions 115 for each partial query in the search index 112 with a reference to the list's partial query. In some implementations, the search system 110 determines a list of query suggestions 115 for a partial query based on queries that have the query characters of the partial query as a stem, or, alternatively or in addition, queries that are related by topic or co-occurrence. The search system 110 can provide the list of query suggestions for each partial query to the advertisement management system 140. Or, the advertisement management system 140 may generate the lists of query suggestions for each partial query.

For each partial query, a commercial value score is determined for each query suggestion identified for the partial query (504). In general, the commercial value score for a query suggestion measures the commercial value of advertisements 113 available or eligible to be provided for the query suggestion 115. An advertisement may be available for a query suggestion if the rules for the advertisement enable the advertisement to be provided for the query suggestion. For example, if an advertiser specifies in a rule that an advertisement may be provided for queries that include certain terms, the advertisement may be eligible for query suggestions that include those terms.

In some implementations, the commercial value score is based on a number of advertisements 113 available for the query suggestion 115. For example, a query suggestion 115 for which there are no suitable advertisements 113 may not be useful for selecting advertisements 113. The advertisement management system 140 can determine the number of advertisements 113 available for a query suggestion 115 in the campaign data 142 based on the terms of the query suggestion, and optionally the campaign data 142.

In some implementations, the commercial value score for a query suggestion 115 is based on the performance of the available advertisements 113 for the query suggestion 115. This performance may be proportional to a click-through rate for the advertisements 113 or a conversion rate for the advertisements 113, to name a couple of examples.

In some implementations, the commercial value score for a query suggestion 115 may be specific to the partial query. For example, some advertisements 113 may perform better for a partial query than other advertisements 113. The advertisement management system 140 may segment performance data 144 for advertisements 113 with respect to the partial queries for which the advertisements 113 are provided. This performance data 144 can be specific for each partial query and advertisement pair. For example, the performance of an advertisement 113 may be stored for each partial query for which the advertisement 113 has been provided.

In some implementations, the commercial value score for a particular query suggestion is based on data regarding query suggestions that are related to the particular query suggestion, query suggestions that are refinements of the particular query suggestion, and/or for query suggestions for which the particular query suggestion is a refinement. As described above, the advertisement management system 140 can identify advertisements 113 for a highest ranking query suggestion and related or refinement query suggestions for the highest ranking query suggestion. In such implementations, the availability and/or performance of advertisements 113 for the related and refinement query suggestions may be of interest to the advertisement management system 140. For example, if the advertisement management system 140 intends to provide advertisements 113 for refinement query suggestions, the advertisement management system 140 may prefer to select query suggestions having associated refinement query suggestions that have high performing advertisements 113. In this example, a query suggestion associated with refinement query suggestions having high performing advertisements 113 may receive a higher commercial value score than a query suggestion associated with refinement query suggestions having lower performing advertisements 113.

In some implementations, the commercial value score for a query suggestion 115 is based on the performance of advertisements 113 that are in the same category or vertical of the query suggestion 115. For example, if advertisements for digital music players perform well, then the commercial value score for the query suggestion "mp3 player" may be high, as mp3 players can be considered in the same category as digital music players.

The commercial value scores are stored (506). For example, the advertisement management system 140 may store the commercial value scores in the query index 146 with a reference to its corresponding query suggestion 115. For commercial value scores that are partial query specific, the commercial value scores may be stored with a reference to its corresponding query suggestion 115 and partial query.

An advertisement request 117 for a partial query is received (508). For example, the advertisement management system 140 may receive the advertisement request 117 from a user device 106 and include data specifying the partial query and/or a set of query suggestions related to the partial query.

In response to receiving the advertisement request 117, the advertisement management system 140 can access the query index to obtain the commercial value scores for query suggestions (510). If the advertisement request 117 includes data specifying a set of query suggestions, the advertisement management system 140 can access the query index 140 to retrieve the commercial value score for each query suggestion specified in the advertisement request 117. If the advertisement request 117 includes a partial query and does not include a set of query suggestions, the advertisement management system 140 can identify query suggestions that are listed in the query index for the partial query and retrieve the commercial value scores for each identified query suggestion.

A proper subset of the query suggestions is identified (512). For example, the advertisement management system 140 can identify the proper subset based on the commercial value scores of the query suggestions 115. The advertisement management system 140 may rank the query suggestions 115 based on the commercial value scores and select a certain number of the highest ranking query suggestions. By way of another example, the advertisement management system 140 may select for the proper subset each query suggestion that has at least a threshold commercial value score.

Figure 6:
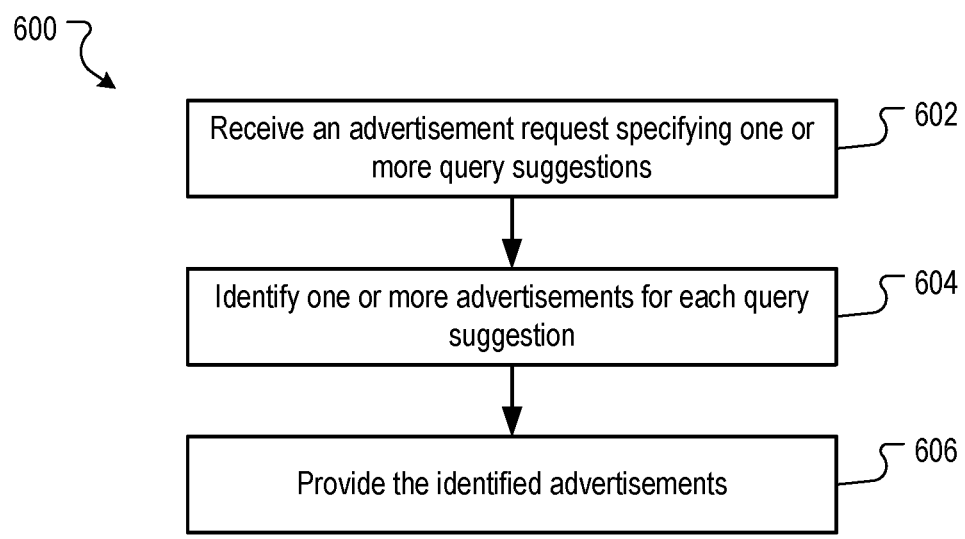
FIG. 6 is a flow chart of an example process for providing advertisements.

FIG. 6 is a flow chart of an example process 600 for providing advertisements. The process 600 can, for example, be implemented by, a data apparatus of the advertisement management system 140. The process 600 can also be implemented by instructions stored on a non-transitory computer readable medium, where execution of the instructions cause a data processing apparatus to perform operations of the process 600.

An advertisement request 117 specifying one or more query suggestions 115 is received (602). For example, the user device 106 may provide the advertisement request 117 in response to instructions received from the search system 110 specifying the query suggestions 115 for which to provide advertisements 113. The advertisement request 117 may also include information specifying a number of advertisements 113 to provide for each query suggestion 115.

One or more advertisements 113 are identified for one or more of the query suggestions 115 specified in the advertisement request (604). For example, the advertisement management system 140 may identify advertisements 113 for a query suggestion 115 based on the query terms of the query suggestion 115, the campaign data 142, and the performance data 144. In some implementations, the advertisement management system 140 provides the campaign data 142 and the performance data 144 as input parameters to an advertisement auction. In particular, the advertisement management system 140 can conduct an auction to select advertisements 113 for each specified query suggestion 115. The advertisements are ranked according to a score that, in some implementations, is proportional to a value based on an advertisement bid and one or more parameters specified in the performance data 144. The advertisements management system 140 can identify a certain number of the highest ranking advertisements 113 for the query suggestion 115, for example the number specified in the advertisement request.

The identified advertisements 113 are provided to the user device 106. For example, the advertisement management system 140 can provide the identified advertisements 113 to the user device 106 over the network 102.

Figure 7A:
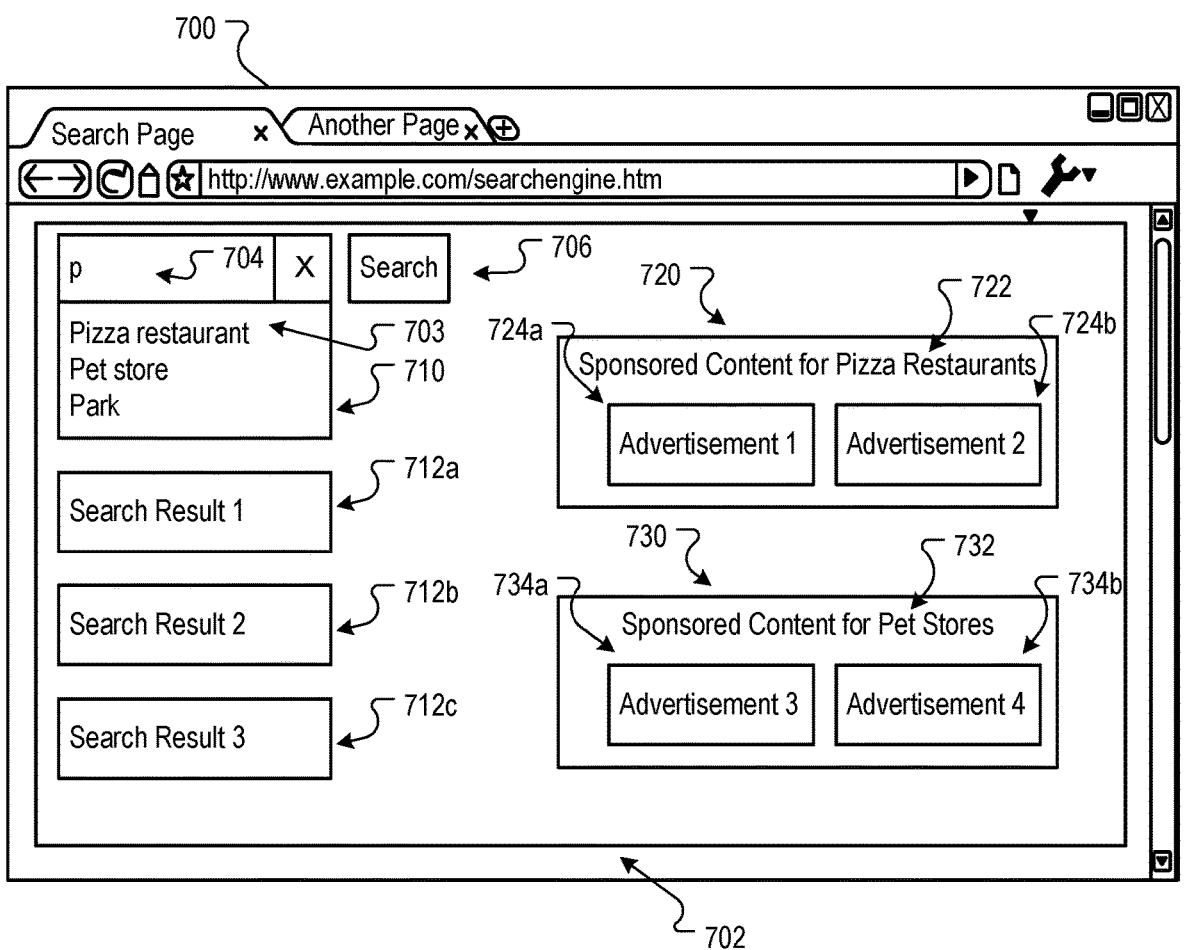
FIGS. 7A and 7B depict an example web search page for presenting advertisements for a partial query based on query suggestions for the partial query.
Figure 7B:
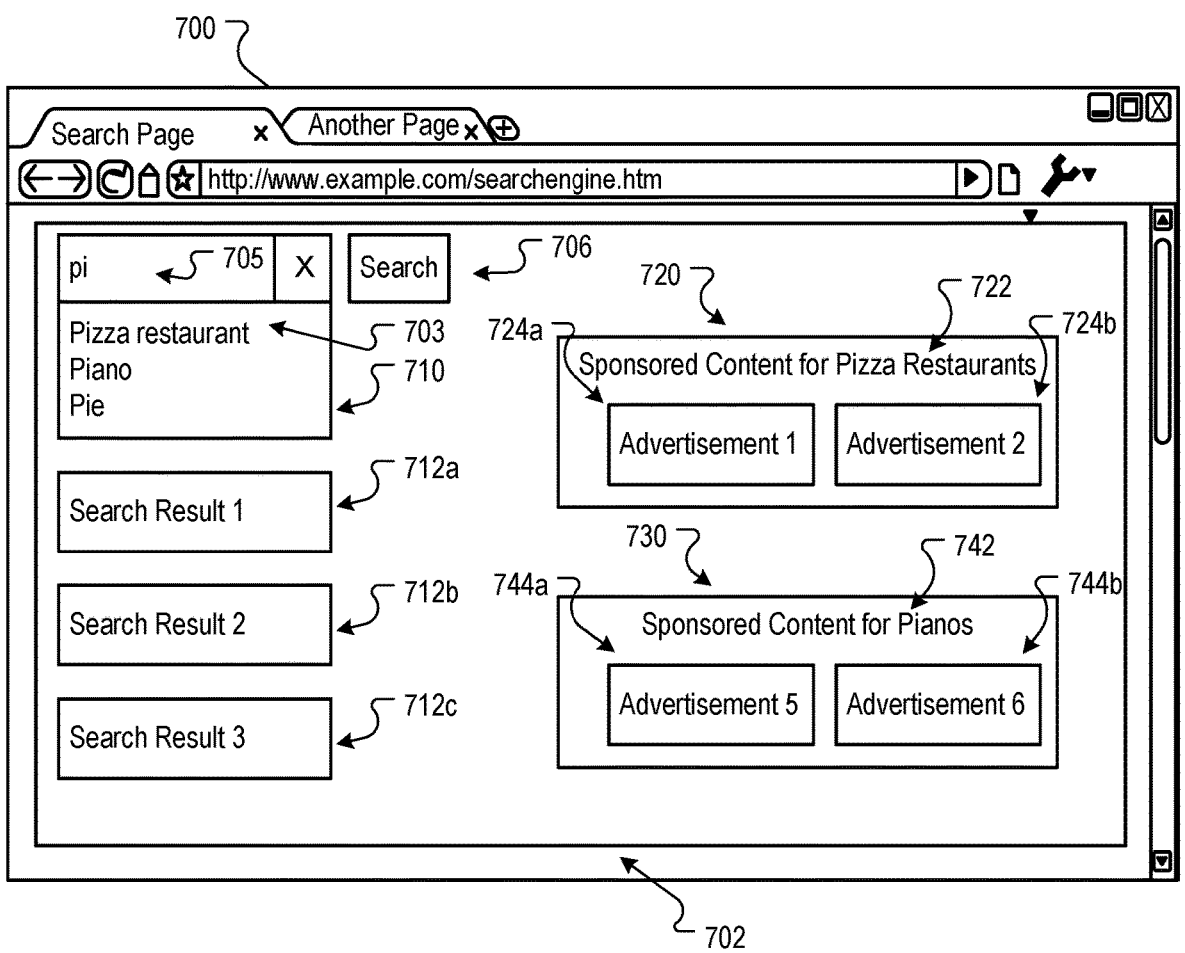

FIGS. 7A and 7B depict an example web search page 700 for presenting advertisements for a partial query based on query suggestions for the partial query. The web search page 700 can be provided by the search system 110 to a user device 106 in response to a request for a search resource, e.g., search page.

The web search page 700 includes a search interface 702. The search interface includes a query input field 703 in which a user can enter a search query 704. In FIG. 7A, the partial query "p" has been entered into the query entry field 703. The search interface 702 also includes a search initiation element 706 with which the user can request that the search query 704 be sent to the search system 110. As described above, the search interface 702 can include instructions that cause the user device 106 to submit as a partial query a query input in the query entry field 703 after a certain number of characters, e.g., one or more have been input into the query entry field 703.

The search interface 702 can display search results, such as search results 712a, 712b, and 712c, provided by the search system 110 in response to a submitted search query or partial query. The search interface 702 can display web, image, video, product, or document search results, to name a few examples.

The search interface 702 includes a query suggestion box 710. In FIG. 7A, the query suggestions "Pizza restaurant," "Pet store," and "Park are query suggestions provided responsive to the partial query "p." For example, the user has entered the text "p" into the query input field 703 and the search interface 702 has caused the user device 106 to send query data defining the partial query "p" to the search system 110. In response, the search system 110 has provided query suggestions 712a, 712b, and 712c for the partial query for presentation in the query suggestion box 710.

The search interface 702 also includes advertisement clusters 720 and 730. The advertisement cluster 720 includes advertisements 724a and 724b that have been selected and provided by the advertisement management system 140 for the query suggestion "Pizza restaurant." The advertisement cluster 720 also includes a label 722 that indicates to the user that the advertisements 724a and 724b in the cluster 720 have been provided for the query suggestion "Pizza restaurant."

Similarly, the advertisement cluster 730 includes advertisements 734a and 734b that have been selected and provided by the advertisement management system 140 for the query suggestion "Pet store." The advertisement cluster 730 also includes a label 732 that indicates to the user that the advertisements 734a and 734b in the cluster 720 have been provided for the query suggestion "Pet store."

As described above, the search interface 702 provided by the search system 110 can include instructions for requesting advertisements from the advertisement management system 140. The instructions for the search interface 702 can include instructions, such as an embedded advertisement script, for sending an advertisement request 117 to the advertisement management system 140. The advertisement request can be generated to specify the query suggestions provided by the search system 110. For example, the advertisement request 117 can be generated to include the query suggestions "Pizza restaurant," "Pet store," "Park," and/or other query suggestions that are not presented in the query suggestion box 710, such as query suggestions ranked lower than the query suggestion "Park." In response to receiving the advertisement request 117, the advertisement management system 140 selects the query suggestions "Pizza restaurant" and "Pet store" for serving advertisements, selects the advertisements 724a, 724b, 734a, and 734b based on the selected query suggestions, and provides the advertisements 724a, 724b, 734a, 734b to the user device 106.

The instructions for the search interface 702 can also include instructions that cause the user device 106 to arrange the advertisements in clusters 720 and 730 and instructions that cause the user device 106 to display the labels 722 and 732 with the clusters 720 and 730, respectively. For example, the instructions may specify a total number of four advertisements are to be displayed on the search interface 702 in two clusters 720 and 730, where each cluster 720, 730 is labeled based on the query suggestion for the cluster 720, 730. In this example, the advertisement management system 140 selected two query suggestions for providing advertisements. If the advertisement management system 140 only selected the query suggestion "Pizza restaurant," then both clusters 720 and 730 may present advertisements for the query suggestion "Pizza restaurant."

FIG. 7B shows the progression from FIG. 7A in response to the user inputting the letter "I" into the query entry field 703 to produce an updated partial query "pi." In FIG. 7B, the query suggestions presented in the query suggestion box 710 have been updated to "Pizza restaurant," "Piano," and "Pie" based on the updated partial query 705. For example, the user device 106 may provide a query suggestion request with the updated partial query 705 to the search system 110 and, in turn, the search system 110 can provide the updated query suggestions to the user device 106.

In FIG. 7B, the advertisement cluster 730 has also been updated in response to the updated partial query 705. In particular, the advertisement cluster 730 has been updated with advertisements 744a and 744b for the query suggestion "pianos." In addition, the advertisement cluster 730 includes an updated label 742 that indicates to the user that the advertisements 744a and 744b have been provided for the query suggestion "Piano." To update the advertisements, the search system 110 may provide instructions to the user device 106 that causes the user device 106 to submit an updated advertisement request to the advertisement management system 140 that includes the query suggestion "Piano" in response to the updated partial query 705. In turn, the advertisement management system 140 identifies and provides the advertisements 744a and 744b to the user device 106 for presentation.

The systems and processes described above can be used for other types of content other than advertisements. For example, search results can be identified and provided for multiple query suggestions in response to a partial query. A search system, such as the search system 110 can receive a partial query, identify and rank query suggestions for the partial query, and provide one or more search results for one or more of the higher ranking query suggestions.

By way of another example, audible menu systems, such as automated phone menus systems, can identify menu options based on partial queries using the processed described above. For example, in response to a user speaking a single word into a phone, the system can identify suggestions that may complete the user's thought and provide menu options or data in response to one or more of the suggestions.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:

receiving, from a computing device, a partial voice query submitted using a search interface of the computing device, the partial voice query being a query that is received prior to a specified user action that identifies the query as complete;

determining a set of query suggestions that complete the partial voice query submitted using the search interface;

accessing an index that maps partial queries to query suggestions and that includes a ranking of the query suggestions, wherein the ranking was performed prior to receiving the partial voice query and is based, at least in part, on a probability of each query suggestion being selected by a user that submitted the partial voice query, such that a given query suggestion is ranked higher when the given query suggestion has a higher probability of being selected by the user;

selecting a subset of the query suggestions, the subset including at least a highest ranked query suggestion based on the ranking, a second query suggestion, and a third query suggestion, wherein each query suggestion of the subset of the query suggestions has been classified with a corresponding topic;

identifying a topic of the highest ranked query suggestion, a topic of the second query suggestion, and a topic of the third query suggestion;

identifying a first content item based on the highest ranked query suggestion;

determining that the topic of the second query suggestion does not match the topic of the highest ranked query suggestion, wherein the second query suggestion of the subset is different from the highest ranked query suggestion;

determining that the topic of the third query suggestion matches the topic of the highest ranked query suggestion, wherein the third query suggestion of the subset is different from the highest ranked query suggestion and the second query suggestion;

identifying a second content item based on the third query suggestion as a result of determining that the topic of the third query suggestion matches the topic of the highest ranked query suggestion and determining that the topic of the second query suggestion does not match the topic of the highest ranked query suggestion;

providing, to the computing device, data that causes presentation of the identified first and second content items at the computing device; and dynamically updating the search interface of the computing device to present the first content item and the second content item.

2. The method of claim 1, wherein the partial voice query is a single word.

3. The method of claim 1, wherein the computing device is a mobile computing device.

4. The method of claim 1, wherein the ranking of the query suggestions is based at least in part on a length of each query suggestion, such that a shorter query suggestion is ranked higher among multiple query suggestions that each have a similar probability of being selected by the user.

5. The method of claim 1, wherein selecting the subset of the query suggestions includes selecting only query suggestions that have been ranked above a predetermined ordinal position in the ranking of the query suggestions.

6. The method of claim 1, further comprising determining a score for each query suggestion, wherein the ranking of the query suggestions is based, at least in part, on the score.

7. The method of claim 6, wherein the score for each query suggestion is proportional to a number of content items that have been associated with the query suggestion.

8. The method of claim 6, wherein the score for each query suggestion is proportional to a historical selection rate of content items that have been associated with the query suggestion.

9. The method of claim 6, further comprising:

storing the score for each query suggestion in the index with a reference to its corresponding query suggestion; and in response to receiving the partial voice query, accessing the index to obtain the score for each query suggestion.

10. The method of claim 1, further comprising identifying a third content item based on the highest ranked query suggestion, and providing, to the computing device, data that causes presentation of the identified third content item at the computing device, wherein dynamically updating the computing device includes presenting the first content item and the third content item in a cluster of content items.

11. The method of claim 10, wherein the first content item and the third content item are provided in the cluster of content items along with a label for the cluster of content items that indicates the highest ranked query suggestion.

12. A system, comprising:

a data store; and one or more processors configured to interact with the data store, the one or more processors being further configured to perform operations comprising:

receiving, from a computing device, a partial voice query submitted using a search interface of the computing device, the partial voice query being a query that is received prior to a specified user action that identifies the query as complete;

determining a set of query suggestions that complete the partial voice query submitted using the search interface;

accessing an index that maps partial queries to query suggestions and that includes a ranking of the query suggestions, wherein the ranking was performed prior to receiving the partial voice query and is based, at least in part, on a probability of each query suggestion being selected by a user that submitted the partial voice query, such that a given query suggestion is ranked higher when the given query suggestion has a higher probability of being selected by the user;

selecting a subset of the query suggestions, the subset including at least a highest ranked query suggestion based on the ranking, a second query suggestion, and a third query suggestion, wherein each query suggestion of the subset of the query suggestions has been classified with a corresponding topic;

identifying a topic of the highest ranked query suggestion, a topic of the second query suggestion, and a topic of the third query suggestion;

identifying a first content item based on the highest ranked query suggestion;

determining that the topic of the second query suggestion does not match the topic of the highest ranked query suggestion, wherein the second query suggestion of the subset is different from the highest ranked query suggestion;

determining that the topic of the third query suggestion matches the topic of the highest ranked query suggestion, wherein the third query suggestion of the subset is different from the highest ranked query suggestion and the second query suggestion;

identifying a second content item based on the third query suggestion as a result of determining that the topic of the third query suggestion matches the topic of the highest ranked query suggestion and determining that the topic of the second query suggestion does not match the topic of the highest ranked query suggestion;

providing, to the computing device, data that causes presentation of the identified first and second content items at the computing device; and dynamically updating the search interface of the computing device to present the first content item and the second content item.

13. The system of claim 12, the operations further comprising determining a score for each query suggestion, wherein the ranking of the query suggestions is based, at least in part, on the score.

14. The system of claim 13, the operations further comprising:

storing the score for each query suggestion in the index with a reference to its corresponding query suggestion; and in response to receiving the partial voice query, accessing the index to obtain the score for each query suggestion.

15. The system of claim 12, the operations further comprising identifying a third content item based on the highest ranked query suggestion, and providing, to the computing device, data that causes presentation of the identified third content item at the computing device, wherein dynamically updating the computing device includes presenting the first content item and the third content item in a cluster of content items.

16. A non-transitory computer storage medium encoded with a computer program, the program comprising instructions that when executed by data processing apparatus cause the data processing apparatus to perform operations comprising:

receiving, from a computing device, a partial voice query submitted using a search interface of the computing device, the partial voice query being a query that is received prior to a specified user action that identifies the query as complete;

determining a set of query suggestions that complete the partial voice query submitted using the search interface;

accessing an index that maps partial queries to query suggestions and that includes a ranking of the query suggestions, wherein the ranking was performed prior to receiving the partial voice query and is based, at least in part, on a probability of each query suggestion being selected by a user that submitted the partial voice query, such that a given query suggestion is ranked higher when the given query suggestion has a higher probability of being selected by the user;

selecting a subset of the query suggestions, the subset including at least a highest ranked query suggestion based on the ranking, a second query suggestion, and a third query suggestion, wherein each query suggestion of the subset of the query suggestions has been classified with a corresponding topic;

identifying a topic of the highest ranked query suggestion, a topic of the second query suggestion, and a topic of the third query suggestion;

identifying a first content item based on the highest ranked query suggestion;

determining that the topic of the second query suggestion does not match the topic of the highest ranked query suggestion, wherein the second query suggestion of the subset is different from the highest ranked query suggestion;

determining that the topic of the third query suggestion matches the topic of the highest ranked query suggestion, wherein the third query suggestion of the subset is different from the highest ranked query suggestion and the second query suggestion;

identifying a second content item based on the third query suggestion as a result of determining that the topic of the third query suggestion matches the topic of the highest ranked query suggestion and determining that the topic of the second query suggestion does not match the topic of the highest ranked query suggestion;

providing, to the computing device, data that causes presentation of the identified first and second content items at the computing device; and dynamically updating the search interface of the computing device to present the first content item and the second content item.

17. The non-transitory computer storage medium of claim 16, the operations further comprising determining a score for each query suggestion, wherein the ranking of the query suggestions is based, at least in part, on the score.

18. The non-transitory computer storage medium of claim 17, the operations further comprising:

storing the score for each query suggestion in the index with a reference to its corresponding query suggestion; and in response to receiving the partial voice query, accessing the index to obtain the score for each query suggestion.

19. The non-transitory computer storage medium of claim 16, the operations further comprising identifying a third content item based on the highest ranked query suggestion, and providing, to the computing device, data that causes presentation of the identified third content item at the computing device, wherein dynamically updating the computing device includes presenting the first content item and the third content item in a cluster of content items.

* * * * *